United States Patent
Patel et al.

(10) Patent No.: US 10,364,655 B2
(45) Date of Patent: Jul. 30, 2019

(54) AUTOMATIC CONTROL OF PRODUCTION AND INJECTION WELLS IN A HYDROCARBON FIELD

(71) Applicant: Saudi Arabian Oil Company, Dhahran (SA)

(72) Inventors: Kalpesh M. Patel, Dammam (SA);
Rohit Patwardhan, Dhahran (SA);
Hussein Salloum, Dammam (SA);
Fouad A. Al-Saif, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 177 days.

(21) Appl. No.: 15/410,961

(22) Filed: Jan. 20, 2017

(65) Prior Publication Data

US 2018/0209248 A1   Jul. 26, 2018

(51) Int. Cl.
| | |
|---|---|
| *E21B 34/06* | (2006.01) |
| *E21B 41/00* | (2006.01) |
| *E21B 43/12* | (2006.01) |
| *E21B 47/06* | (2012.01) |
| *E21B 47/10* | (2012.01) |

(Continued)

(52) U.S. Cl.
CPC .......... *E21B 41/0092* (2013.01); *E21B 34/06* (2013.01); *E21B 43/128* (2013.01); *E21B 43/16* (2013.01); *E21B 47/0007* (2013.01); *E21B 47/06* (2013.01); *E21B 47/10* (2013.01)

(58) Field of Classification Search
CPC .. E21B 41/0092; E21B 34/06; E21B 47/0007; E21B 47/06
See application file for complete search history.

(56) References Cited

U.S. PATENT DOCUMENTS

| 7,079,952 B2 | 7/2006 | Thomas et al. |
| 8,280,635 B2 | 10/2012 | Ella et al. |
| 9,141,114 B2 | 9/2015 | Slupphaug et al. |

(Continued)

FOREIGN PATENT DOCUMENTS

| WO | 2007102079 | 9/2007 |
| WO | 2007116008 A1 | 10/2007 |
| WO | 2013135288 A1 | 9/2013 |

OTHER PUBLICATIONS

International Search Report and Written Opinion issued in International Application No. PCT/US2018/013137 dated Apr. 20, 2018, 13 pages.

*Primary Examiner* — Catherine Loikith
(74) *Attorney, Agent, or Firm* — Fish & Richardson P.C.

(57) ABSTRACT

In a hydrocarbon field including multiple production wells and injection wells, at a hydrocarbon field level, a long-term field-level target and optional long-term well-level targets for the field are received by a field-level processor. The long-term field-level target including a long-term field-level production target indicating a quantity of hydrocarbons to be produced and a long-term field-level injection target indicating a quantity of fluid to be injected into the field. The field-level processor determines short-term individual production targets for the production wells and short-term individual injection targets for the injection wells to achieve the long-term field-level target. At an individual well level, individual hydrocarbon productions of the production wells or individual fluid injections of the injection wells are controlled, by at least one individual well-level processor independent of the field-level processor, to achieve the long-term field-level target.

19 Claims, 5 Drawing Sheets

(51) Int. Cl.
*E21B 47/00* (2012.01)
*E21B 43/16* (2006.01)

(56) References Cited

U.S. PATENT DOCUMENTS

| | | |
|---|---|---|
| 2003/0047308 A1 | 3/2003 | Hirsch et al. |
| 2005/0173114 A1 | 8/2005 | Cudmore et al. |
| 2008/0262735 A1 | 10/2008 | Thigpen et al. |
| 2008/0262736 A1 | 10/2008 | Thigpen et al. |
| 2008/0262737 A1 | 10/2008 | Thigpen et al. |
| 2010/0042458 A1 | 2/2010 | Rashid |
| 2015/0134127 A1 | 5/2015 | Fleming et al. |
| 2015/0241881 A1 | 8/2015 | Ige et al. |
| 2016/0290077 A1 | 10/2016 | Aske et al. |

| Controller | CV | MV | DV | My View | FAQs | Configuration | | | | | Drop All | Control |
|---|---|---|---|---|---|---|---|---|---|---|---|---|
| 88 | CV Name | CV Description | | | Status | Low Limit | Value | SS Value | High Limit | | SetPoint | |
| | Fi | Oil flow | | | GOOD-C | 5000.0 | 4997.6 | 5000.0 | 5000.0 | | 5000 | |
| | Chk_DP | Choke DP | | | GOOD-C | 500.000 | 56.406 | 5000.0 | 400.00 | | | |
| | PI | Well head pressure | | | GOOD | 100.00 | 366.37 | 360.48 | 430.00 | | | |
| | DH-FLOW | % Downhole flow | | | GOOD | 353.67 | 42.989 | 42.942 | 100.00 | | | |
| | EI | VFD voltage | | | GOOD | 100.00 | 489.00 | 479.51 | 480.00 | | | |
| | TI | Motor temperature | | | GOOD | 1100.0 | 258.40 | 261.51 | 300.00 | | | |
| | PI | Pump intake pressure | | | GOOD | 1100.0 | 1245.0 | 1244.7 | 3000.0 | | | |
| | PI | Pump discharge pressure | | | GOOD | 1100.0 | 2157.3 | 2150.9 | 2400.0 | | | |
| | MtrVolt_A | %Motor voltage Phase A | | | GOOD | 90.000 | 104.65 | 104.65 | 110.00 | | | |
| | MtrVolt_B | %Motor voltage Phase B | | | GOOD | 90.000 | 104.53 | 104.53 | 110.00 | | | |
| | MtrVolt_C | %Motor voltage Phase C | | | GOOD | 90.000 | 104.64 | 104.64 | 110.00 | | | |
| | MtrCur_A | %Motor Current Phase A | | | GOOD | 70.000 | 97.667 | 97.370 | 105.00 | | | |
| | MtrCur_B | %Motor Current Phase B | | | GOOD | 70.000 | 100.73 | 100.65 | 105.00 | | | |
| | MtrCur_C | %Motor Current Phase C | | | GOOD | 70.000 | 98.007 | 97.753 | 105.00 | | | |

| 88 | MV Name | MV Description | Mode | Status | Low Limit | Value | SS Value | High Limit | Move | Move Cause |
|---|---|---|---|---|---|---|---|---|---|---|
| | FIC | Choke valve command | RMPC | READY | 30.000 | 34.000 | 34.775 | 45.000 | 0.4020 | Optimization |
| | KS | ESP speed command | RMPC | READY | 63.000 | 66.900 | 66.836 | 69.000 | -0.0288 | Optimization |
| | KS | Volt At 60Hz | OPER | FFWD | 405.00 | 430.49 | 430.49 | 450.00 | 0 | Not Determined |

FIG. 2

AUTOMATIC CONTROL OF PRODUCTION AND INJECTION WELLS IN A HYDROCARBON FIELD

TECHNICAL FIELD

This disclosure relates to controlling production and injection wells in a hydrocarbon field, for example, for efficient extraction of hydrocarbons (for example, oil and natural gas) in the hydrocarbon field.

BACKGROUND

Hydrocarbon fields include production wells through which hydrocarbons are produced. Sometimes, the fields include injection wells through which fluids are flowed into the hydrocarbon fields to produce hydrocarbons through the production wells. Operating a hydrocarbon field can include, among other things, controlling fluid flow through the wells in the field.

SUMMARY

This disclosure relates to automated (or automatic) control of production and injection wells in a hydrocarbon field.

A computer-implemented method for controlling a number of wells in a hydrocarbon field, the method including receiving a long-term field-level target for a number of wells in the field, the long-term field-level target including a long-term field-level production target that indicates a quantity of hydrocarbons to be produced from the field through a number of production wells; receiving a field-level production measurement for the number of wells in the field, wherein the field-level production measurement represents a quantity of hydrocarbons being produced from the field; determining that the long-term field-level production target is different from the field-level production measurement; in response to determining that the long-term field-level production target is different from the field-level production measurement, calculating, by a supervisory model predictive control (MPC) controller, one or more short-term individual well-level production targets of one or more production wells in the field to achieve the long-term field-level target according to a model that represents an effect of change in the one or more short-term individual well-level production targets on the long-term field-level production target, wherein each of the one or more short-term individual well-level production targets indicates a quantity of hydrocarbons to be produced from each of the one or more production wells; and for each of the one or more production wells in the field, receiving a well-level production measurement of the each of the one or more production wells, wherein the well-level production measurement represents a quantity of hydrocarbons being produced from the each of the one or more production wells; and manipulating, by a controller independently from the supervisory MPC controller based on the well-level production measurement to achieve the short-term individual well-level target of the each of the one or more production wells received from the supervisory MPC controller, a well-level manipulation variable of the each of the one or more production wells, wherein manipulating the well-level manipulation variable of the each of the one or more production wells includes manipulating a valve or an electrical submersible pump (ESP) associated with the each of the one or more production wells.

In some implementations, the method further including receiving optional long-term well-level targets for the number of wells in the field, wherein each of the optional long-term well-level targets includes a production target for each of the number of wells in the field; and wherein calculating one or more short-term individual well-level production targets of one or more production wells in the field includes either adjusting the optional long-term well-level targets or by developing the one or more short-term individual well-level targets themselves.

In some implementations, the number of wells further include a number of injection wells, the long-term field-level target further includes a long-term field-level injection target that indicates a quantity of fluid to be injected into the field through the number of injection wells; the optional long-term well-level targets further include optional well-level targets for the injection wells in the field; and the one or more short-term individual well-level targets further include one or more short-term individual well-level targets for one or more injection wells in the field; and the method further including calculating, by the supervisory MPC controller, one or more short-term individual well-level injection targets of the one or more injection wells in the field to achieve the long-term field-level injection target according to the model, the model further representing an effect of change in the one or more short-term individual well-level injection targets on the long-term field-level injection target.

In some implementations, the model includes one or more field-level control variables of the number of wells in the field, wherein the one or more field-level control variables have corresponding field-level control variable targets, and the one or more field-level control variables and the corresponding field-level control variable targets represent the long-term field-level target.

In some implementations, calculating the one or more short-term individual well-level production targets of one or more production wells and the one or more short-term individual well-level injection targets of one or more injection wells in the field, to achieve the long-term field-level target according to the model includes adjusting the one or more short-term individual well-level production targets of one or more production wells and the one or more short-term individual well-level injection targets of one or more injection wells in the field, such that the one or more field-level control variables of the number of wells in the field achieve the corresponding field-level control variable targets.

In some implementations, the one or more field-level control variables are associated with corresponding priorities, wherein the priorities indicate weights of the corresponding field-level control variable targets in achieving the long-term field-level target.

In some implementations, the one or more field-level control variables includes one or more of a quantity of field-level oil flow; a quantity of field-level water injection flow; an oil production target of an individual well; a water injection target of an individual well; a disposal water header pressure; a reservoir pressure; or an injection to production ratio.

In some implementations, manipulating, by a controller independently from the supervisory MPC controller, a well-level manipulation variable of the each of the one or more production wells includes manipulating, by an individual MPC controller, the well-level manipulation variable based on an individual well-level model of the each of the one or more production wells, wherein the individual well-level model represents an effect of change of the well-level manipulation variable on the individual well-level control variables, based on a location of an operating point in an ESP operating envelope.

In some implementations, manipulating a well-level manipulation variable of the each of the one or more production wells, based on the well-level production measurement includes manipulating the well-level manipulation variable of the each of the one or more production wells, such that one or more well-level control variables achieve corresponding well-level control variable targets of the each of the one or more production wells, wherein the one or more well-level control variables and the corresponding well-level control variable targets represent the individual well-level target of the each of the one or more production wells, and wherein the well-level production measurement represents a measurement of the one or more well-level control variables.

In some implementations, the one or more well-level control variables and the corresponding well-level control variable targets further represent individual operating envelope of the each of the one or more production wells.

In some implementations, the one or more well-level control variables are associated with corresponding priorities, wherein the priorities indicate weights of the corresponding well-level control variable targets in achieving the individual well-level target of the each of the one or more production wells.

In some implementations, the well-level control variable includes one or more of a quantity of individual oil flow; a quantity of downhole flow; a wellhead pressure; a choke differential pressure (DP); a pump suction pressure; a pump discharge pressure; a motor current; a motor volt; or a motor temperature.

In some implementations, the well-level manipulation variable includes one or more of an opening of a choke valve; a speed of the ESP; or a voltage to speed ratio of the ESP.

A system including one or more computers that include a supervisory model predictive control (MPC) controller; at least one individual controller; a non-transitory computer-readable storage medium coupled to the supervisory MPC controller, and the at least one individual controller and storing programming instructions for execution by the supervisory MPC controller, and the at least one individual controller, the programming instructions instructing the supervisory MPC controller and the at least one individual controller to receive a long-term field-level target for a number of wells in the field, the long-term field-level target including a long-term field-level production target that indicates a quantity of hydrocarbons to be produced from the field through a number of production wells; receive a field-level production measurement for the number of wells in the field, wherein the field-level production measurement represents a quantity of hydrocarbons being produced from the field; determine that the long-term field-level production target is different from the field-level production measurement; in response to determining that the long-term field-level production target is different from the field-level production measurement, calculate, by the supervisory MPC controller, one or more short-term individual well-level production targets of one or more production wells in the field to achieve the long-term field-level target according to a model that represents an effect of change in the one or more short-term individual well-level production targets on the long-term field-level production target, wherein each of the one or more short-term individual well-level production targets indicates a quantity of hydrocarbons to be produced from each of the one or more production wells; and for each of the one or more production wells in the field, receive, a well-level production measurement of the each of the one or more production wells, wherein the well-level production measurement represents a quantity of hydrocarbons being produced from the each of the one or more production wells; and manipulate, by the at least one individual controller independently from the supervisory MPC controller based on the well-level production measurement to achieve the short-term individual well-level target of the each of the one or more production wells received from the supervisory MPC controller, a well-level manipulation variable of the each of the one or more production wells, wherein manipulating the well-level manipulation variable of the each of the one or more production wells includes manipulating a valve or an electrical submersible pump (ESP) associated with the each of the one or more production wells.

In some implementations, the programming instructions further instruct the supervisory MPC controller and the at least one individual controller to receive optional long-term well-level targets for the number of wells in the field, wherein each of the optional long-term well-level targets includes a production target for each of the number of wells in the field; and wherein the number of wells further include a number of injection wells, the long-term field-level target further includes a long-term field-level injection target that indicates a quantity of fluid to be injected into the field through the number of injection wells, the optional long-term well-level targets further include optional long-term well-level targets for the number of injection wells in the field, and the short-term well-level targets further include short-term well-level targets for the number of the injection wells in the field.

In some implementations, the at least one individual controller includes at least one individual MPC controller for manipulating the well-level manipulation variable of the each of the one or more production wells to achieve the short-term individual well-level target of the each of the one or more production wells; and at least one of an individual MPC controller or a proportional-integral-derivative (PID) controller for manipulating a well-level manipulation variable of an injection well to achieve the short-term individual well-level target of the each of the one or more injection wells.

In some implementations, the well-level manipulation variable includes one or more of an opening of a choke valve; a speed of the ESP; or a voltage to speed ratio of the ESP.

Another including, in a hydrocarbon field including a number of production wells and a number of injection wells operated to produce hydrocarbons from the field, at a hydrocarbon field level, receiving, by a hydrocarbon field-level processor, a long-term field-level target and optional long-term well-level targets for the hydrocarbon field, the long-term field-level target including a long-term field-level production target that indicates a quantity of hydrocarbons to be produced from the field through the number of production wells and a long-term field-level injection target that indicates a quantity of fluid to be injected into the field through the number of injection wells; determining by the hydrocarbon field-level processor, short-term individual targets for the number of production wells and short-term individual fluid injection targets for the number of injection wells to achieve the long-term field-level hydrocarbon production target; and at an individual well level, controlling, by at least one individual well-level processor that is independent of the hydrocarbon field-level processor, individual hydrocarbon productions of the number of production wells or individual fluid injections of the number of injection wells to achieve the long-term field-level target for the hydrocarbon field, wherein manipulating individual hydrocarbon productions of the number of production wells or individual fluid injections of the number of injection wells includes manipulating a valve or an electrical submersible pump (ESP) associated with one of the number of production wells.

In some implementations, the method further including receiving an indication of one or more underperforming wells among the number of production wells and the number of injection wells; and wherein determining by the hydrocarbon field-level processor, short-term individual hydrocarbon production targets for the number of production wells and short-term individual fluid injection targets for the number of injection wells to achieve the long-term field-level hydrocarbon production target includes distributing one or more individual targets of the one or more underperforming wells among remaining wells of the number of wells in the field to maintain the long-term field-level target.

In some implementations, wherein controlling individual hydrocarbon productions of the number of the production wells includes manipulating a manipulation variable of one of the number of the production wells to achieve the short-term individual hydrocarbon production target of the one of the number of the production wells, wherein the manipulation variable includes one or more of an opening of a choke valve; a speed of an ESP; or a voltage to speed ratio of the ESP.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

FIG. 2 is a plot showing an example user interface of an MPC controller for a production well.

Like reference numbers and designations in the various drawings indicate like elements.

DETAILED DESCRIPTION

Figure 1:
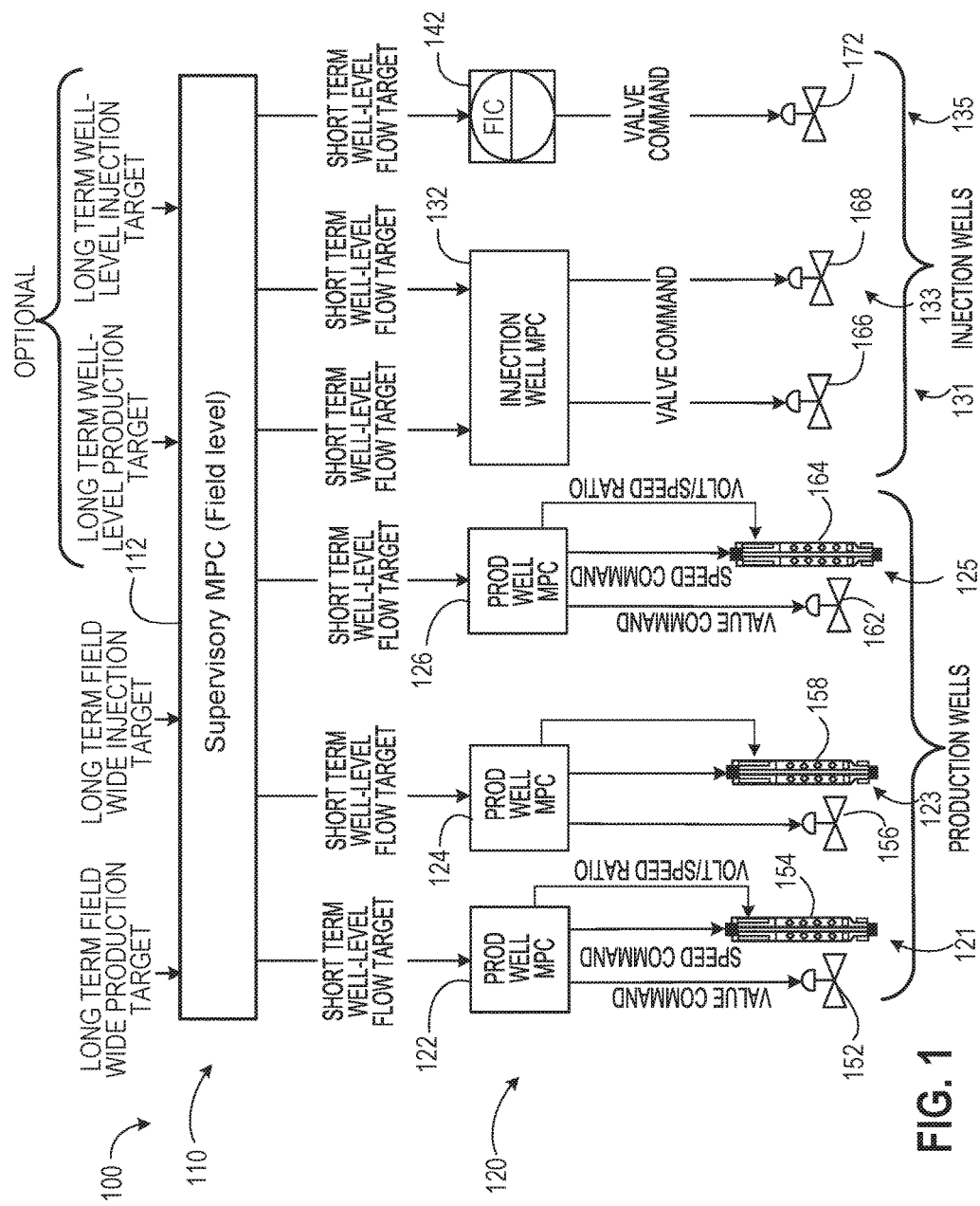
FIG. 1 shows an example overall Model Predictive Control (MPC) system for automated control of production and injection wells in a hydrocarbon field.

In practical systems, a large number of production wells and injection wells are deployed in an oil field. Problems and challenges exist in handling the huge amount of data and making various decisions on a daily basis. For example, operational issues might occur during the course of day to day operation of the oil field. The operational issues may lead to, for example, over or under injection or production, impaired or even permanently limit well productively or other poor overall performance of the oil field.

Example techniques described here help address the day-to-day operational challenges of controlling a large number of production and injection wells in a hydrocarbon field (for example, a conventional oil field or an intelligent oil field). For example, the techniques can be applied to an oil field that includes hundreds of wells and maintains over thousands of measurements (for example, about 400 wells and having over 15,000 measurements). The example techniques monitor the large number of production and injection wells on a regular basis (for example, in real time), analyze the large amount of data and make consistent decisions to resolve operational issues. The example techniques can improve the efficiency of extracting hydrocarbons from the hydrocarbon field.

For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are taken soon enough such that a potential problem is avoided or an existing problem is resolved as soon as possible. For example, the action and the response are temporally proximate such that an individual perceives the action and the response occurring substantially simultaneously.

In some implementations, the example techniques use Model Predictive Control (MPC), also called Advanced Process Control (APC), technology to automate the monitoring of thousands of variables simultaneously, and control and optimize hundreds of wells in an oil field, in a consistent manner. In some implementations, the example techniques use MPC technology in a layered monitoring and control strategy (for example, a two-layer strategy). As an example implementation, one MPC controller is implemented for each production well, while a combination of MPC and proportional-integral-derivative (PID) controllers are implemented for each injection well. At the field level, a supervisory MPC controller is used to coordinate multiple production well MPC controllers and injection well MPC or PID controllers.

The example techniques break the bigger field-wide control problem into smaller pieces of individual well control without the complexity of considering what is happening to other wells or the whole field. The example techniques coordinate the multiple individual wells, at a field level, without the complexity of getting into details of each individual well variables. In some implementations, the example techniques leverage empirical step response models (for example, with self-adapting gains based on operating conditions) by using the MPC controllers for both layers. As such, the overall monitoring and control can be executed, for example, on a minute-by-minute basis in a computationally efficient manner.

The example techniques can approach or achieve optimal overall performance in the oil field. The example techniques help maintain the large number of production and injection wells to operate as close as possible to their targets, without human intervention and even in presence of upsets (for example, well trips, shut-ins, and maintenance) happening on a daily basis. Rather than only focusing on the production wells, the example techniques control both production and injection wells in the field. The example techniques allow a field-wide coordination of the production and injection wells while treating the production and injection wells as separate, independent entities, as opposed to a single entity of a production-injection well pair.

The example techniques help monitor thousands of variables as well as control and optimize the operation of hundreds of wells in a conventional oil field simultaneously and consistently. For example, the MPC technology can be used with oil recovery techniques (for example, a secondary oil recovery technique where water is injected in the reservoir and Electric Submersible Pumps (ESPs) are used as artificial lift equipment for oil production). In some implementations, unlike surface facilities for gathering and processing of the oil, the example techniques can be used for sub-surface oil extraction which happens before or is upstream of the gathering and processing of oil.

The example techniques can help resolve various operational issues and improve the overall well performance of the hydrocarbon field. The example techniques help maintain a steady field production, thus preventing causing disturbances for the downstream process. The example techniques help prevent over production from wells, thus reducing or preventing multi-phase flow fluctuations and water coning conditions that could potentially limit well productivity permanently. The example techniques can lower operating expenses (OPEX) and sustain Capital expenditures (CAPEX) while maintain production at target. For instance, the example techniques can enable production at lower water-cut and lower differential pressure (DP) drop across choke valve resulting in less power consumption by the ESP. The example techniques can require less operating cost for separating oil and water in gas oil separation plant (GOSP) The example techniques can lower water injection resulting in less power consumption by water injection pumps. The example techniques help keep ESPs being operated at, or near, optimal operating point, thus increasing the run life of ESPs. The example techniques can reduce CAPEX by achieving consistent water front progression through the reservoir that results in better volumetric sweep efficiency and less wells required to recover the oil. The example techniques may achieve additional or different advantages.

A hydrocarbon field can include many (for example, tens and hundreds of) production wells through which hydrocarbon (for example, oil or natural gas) is produced. The hydrocarbon field can also include many (for example, tens and hundreds of) injection wells. As an example, a hydrocarbon field includes 300 production wells and 150 injection wells. In some implementations, one or more injection wells are arranged surrounding a production well to facilitate production. Each of the production wells and injection wells has equipment including pumps (for example, ESPs) and valves installed to facilitate production. The equipment can be controlled using one or more MPC and/or PID controllers.

Typically, a PID controller is a control loop feedback controller that calculates an error value (that is, the difference between a desired setpoint and a measured process variable) and applies a correction based on proportional, integral, and derivative terms of the error, respectively. For example, the PID controller attempts to minimize the error over time by adjusting control variables (CVs), such as the position of a control valve, a damper, or the power supplied to a motor, to new values determined by a weighted sum of the proportional, integral, and derivative terms of the error. However, PID controllers may not be able to adequately control dynamic characteristics such as large time delays and high-order dynamics.

Unlike a PID controller, an MPC controller can anticipate future events and take control actions accordingly. The MPC controller includes an internal dynamic model of a process (also referred to as an internal model or an MPC model) that represents the behavior of a dynamical system (for example, a production well or an injection well). For example, an MPC model of an MPC controller installed for a production well of an oil field can represent the dynamics of an oil production process through the production well. MPC models can predict changes in dependent variables of the modeled system that will be caused by changes in independent variables. Independent variables can include manipulation variables (MVs) that can be adjusted by the controller and variables that cannot be adjusted by the controller (for example, used as disturbances). Example MVs include setpoint of regulatory PID controllers (pressure, flow, temperature, etc.) or the control elements (valves, dampers, etc.). Dependent variables include control variables (CVs) that represent control objectives or process constraints.

An MPC controller can use the current field measurements, the current dynamic state of the process, the MPC models, and the process variable targets and limits to calculate future changes in the dependent variables. These changes are calculated to hold the dependent variables close to target while honoring constraints on both independent and dependent variables. For example, the MPC controller keeps CVs within a range or at a target by changing one or more MVs based on the MPC model.

In some implementations, the MPC model can be built using data from specific tests or otherwise built based on historic data. The MPC model can be a linear model or a non-linear model. The MPC model can represent an effect of a change in the MVs on the CVs. As an example, for an MPC controller implemented for a production well with ESP, an MV-CV relationship changes represented by the MPC model may depend on a location of an operating point in the ESP operating envelope. To develop a model that effectively represents the ESP operating envelope, in some implementations, a non-linear model can be identified using data collected while operating in the whole EPS operating envelope. In some implementations, a linear model can be identified using data collected while operating in a few regions of the operating envelope and using existing knowledge (for example, Affinity law and interpolation) to update the gains in the identified model based on gain scheduling techniques. In some implementations, the collected data can be as comprehensive as possible, including at least all the MVs and CVs. Generally, all available measurements are collected so as not to miss anything. In some implementations, data collection can be done using specialized data collection software or can be extracted out of an existing data historian.

Example MPC Architecture and Operation

FIG. 1 shows an example overall MPC system 100 for automated control of production and injection wells in a hydrocarbon field (for example, an oil field). As illustrated in FIG. 1, the example overall system 100 shows a two-layer or two-level architecture that includes a field level 110 and a well level 120. The well level refers to a lower level of monitoring and control with respect to each individual well in the field. For example, at the well level, each well is monitored and controlled individually, for example, by an MPC controller, a PID controller, or a combination of these and other controllers. As illustrated in FIG. 1, at a well level 120, an MPC controller is implemented for each production well (for example, MPC controllers 122, 124, and 126 for production wells 121, 123, and 125, respectively). An MPC controller, a flow PID controller, or a combination of both can be implemented for each injection well. As illustrated in FIG. 1, an MPC controller 132 is implemented for an injection well 131 and 133 while a PID controller 142 is implemented for an injection well 135. The hydrocarbon field can include more production wells and injection wells.

Well-level Control

The well-level monitoring and control focus on achieving an individual goal of each well by manipulating individual variables of the each well. For example, when ESPs 154, 158, and 164 are used for artificial lift, the MPC controllers 122, 124, and 126 can monitor all the variables or parameters (such as CVs) associated with the production wells 121, 123, and 125, respectively. The CVs include process variables that the operator and engineers monitor and strive to keep within a range or at a target. Example CVs include oil/water flow, downhole and surface pressures/temperatures, ESP motor current/voltage, and other safety, equipment and process variables.

The MPC controllers 122, 124, and 126 can predict future behavior of the monitored CVs, for example, based on internal models of the MPC controllers and automatically manipulate the available handles (also referred to as MVs). The MVs include variables that can be manipulated or changed remotely. Example MVs include open/close positions of the choke valves 152, 156, and 162, speeds and voltage/speed ratios of the ESPs 154, 158, and 164. For example, the MPC controllers 122, 124, and 126 can automatically read, receive or monitor the current field measurements of the MVs and use the current dynamic state of the process, the MPC model, and the process variable targets and limits to calculate future changes required in MVs, for example, to maintain production at short-term (for example, hourly/daily) flow target and operate ESPs 154, 158, and 164 as efficiently as possible while honoring the well and ESP operation envelopes including upthrust/downthrust limits, motor nameplate rating limits, etc.

For injection wells, in some implementations, the injection wells can be monitored and controlled individually or in a group. As an example, the injection well 135 is monitored and controlled by a dedicated PID controller 142. The injection wells 131 and 133 are monitored and controlled by a single MPC controller 132. The MPC 132, the PID controller 142 or both can monitor well injection flow and pressure, consider the interaction between the injection wells 131, 133 and 135 as well as the effect of header pressure changes, and automatically manipulate the openings of the choke valves 166, 168 and 172 of the injection wells 131, 133 and 135, respectively, to maintain the injection at short-term flow target as much as possible.

Field-level Control

The field level (also referred to a group level) refers to a higher level of monitoring and control for achieving a long-term (for example, weekly/monthly) global target of all wells in the field (or an aggregated or collective group target of multiple wells in the field). In some implementations, a single supervisory MPC controller can be implemented in the entire filed (or for a group of wells of the field) that coordinates various well-level controllers (for example, the MPC controllers 122, 124, 126 and 132 and the PID controller 142) implemented for each individual well. The supervisory MPC controller can coordinate the various controllers, for example, by distributing or otherwise determining respect short-term targets for the various well-level controllers to achieve the long-term global target. As illustrated in FIG. 1, at the field level 110, a supervisory MPC controller 112 is implemented to coordinate the well level MPC controllers 122, 124, 126, and 132 and the PID controller 142 for all the production wells 121, 123, and 125 and injection wells 131, 133, and 135.

For the field-level monitoring and control 110, the supervisory MPC controller 112 can monitor and maintain field-wide production and injection at long-term field targets by manipulating the individual well short-term flow targets for the multiple wells 125 and 135, for example, to account for upsets in one or more wells. The upsets can include, for example, well shut-ins, wells being unable to inject or produce enough due to reaching their potential or other upsets. The MPC controller can also look at the reservoir pressure or field-wide injection to production ratio (IPR) and manipulate short-term individual well flow targets to maintain a balance between production and injection.

In the following, example designs for well-level controllers (for example, MPC controller for production wells and PID controllers for injection wells) and the field-level supervisory MPC controller are described. In some implementations, variations and modifications can be made for implementing the two-layer automatic control of production and injection wells in a hydrocarbon field.

Well-level MPC Controller Design for Production Wells

In some implementations, an objective of a production well MPC controller is to manipulate the MVs to maintain the oil production CV around its short-term flow target and to minimize the power consumption of ESP while honoring process and equipment constraints included as CVs. In some implementations, the objective can be represented by one or more CVs in connection with their respective targets or limits. Table 1 lists example CVs and their respective targets/limits of a production well MPC controller. Table 1 also explains the respective purposes of using the CVs and their respective targets/limits. For instance, an oil flow is an example CV. A target value or a narrow range around the short-term flow target value can be used to indicate that an objective of the production well is to produce oil at or around the short-term oil flow target.

In some implementations, a priority value can be assigned to a CV so as to indicate the importance or weight of the CV and its objective among the multiple CVs and their respective objectives. The priority values can be used to formulate a multiple-objective control or optimization problem. In some implementations, honoring equipment or process constraints will be given higher priority than achieving flow compliance. In some implementations, achieving flow compliance will be given higher priority than minimizing power consumption. Table 1 also shows example priority values of each of the example CVs. As illustrated, maintaining a wellhead pressure, another CV, below a high limit is of higher priority (Priority 1) than maintaining the oil flow at or around its target value (Priority 2). Maintaining the oil flow at or around its target value is of higher priority (Priority 2) than the choke differential pressure (DP) achieving its high limit for minimizing power consumption (Priority 3). One of the equipment constraints, not explicitly included in Table 1, is on the movement of choke valve. As the choke valve uses electric actuators instead of pneumatic actuators, they are not designed to move on a continuous basis. In some implementations, the MPC controller can be tuned to achieve minimal movement of the choke valves.

TABLE 1

Example CVs and their objectives, purposes and priorities of a production well MPC controller

| CV | Target/Limits | Purpose | Priority |
|---|---|---|---|
| Oil flow | Target or narrow limits around the target | Produce oil around short-term flow target. | 2 for both limits |
| downhole flow | High/Low limits | Operate ESP away from up thrust and down thrust limits | 1 (Highest priority) for both limits |
| Wellhead pressure | High limit | Maintain below high limit | 1 (Highest priority) |
| Choke DP | High/Low limit | Minimize or maintain within a range to minimize power consumption | 1 (Highest priority) for Low limit and 3 (Lowest priority) for High limit |
| Pump suction pressure | Low limit | Maintain above bubble point pressure | 1 (Highest priority) |
| Pump discharge pressure | High limit | Maintain below high limit | 1 (Highest priority) |
| Motor current | High/Low limit | Maintain within motor current rating | 1 (Highest priority) for both limits |
| Motor volts | High/Low limit | Maintain within motor volt rating | 1 (Highest priority) for both limits |
| Motor temperature | High limit | Maintain below motor temperature rating | 1 (Highest priority) |

Table 2 lists example MVs and their respective objectives in a production well MPC controller. In some implementations, the ESP trip settings can be changed remotely along with ESP speed MV changes.

TABLE 2

Example MVs and their objectives of a production well MPC controller

| MV | Objective | Remarks |
|---|---|---|
| ESP speed | Minimize | Some of the ESP trip settings can be changed remotely along with ESP speed changes |
| Choke valve opening | Maximize | |
| Voltage to speed ratio | Minimize | |

The voltage to speed ratio refers to the relationship between Variable Frequency Drive (VFD) volts and ESP speed. The VFD volts change linearly with speed as per this ratio. In some instances, using the choke valve of the production well in addition to the ESP speed and voltage to speed ratio of the ESP allows achieving a specific target production flow in addition to operating ESP efficiently.

Well-level Controller Design for Injection Wells

For the injection wells, in some implementations, MPC controllers can be used to automate several interacting wells. In some implementations, flow PID controllers can be used instead of implementing MPC controllers (for example, when little interaction is observed between the injection wells). In some implementations, an objective of the injection well is to maintain injection flow around its short-term target while minimizing the choke valve movement for the reasons mentioned above. The PID controllers (for example, implemented in the Remote Terminal Units (RTU)) can be configured to enable GAP control feature (for example, to slow down the controller action when flow is within a GAP zone around the setpoint) to minimize the choke valve movement. A low and high limit can also be configured in the PID controllers to limit extreme movement in the choke valves in the event of a large change in the header pressure or faulty flow reading.

Field-level Supervisory MPC Controller Design

In some implementations, an objective of the supervisory MPC controller is to maintain a group- or field-wide production and injection at its long-term target by manipulating the short-term individual well targets. In some instances, such a control mechanism can ensure group/field wide target compliance as much as possible, even when some wells trip or are not available, or have reached their potential, or the injection water supply pressure changes. The supervisory MPC controller can interface with the well-level MPC controllers so that any limitation on the individual wells are automatically taken into consideration. Table 3 lists example CVs and their respective targets/limits, purposes and priorities in a supervisory well MPC controller. Table 4 lists example MVs and their respective objectives in a supervisory MPC controller.

TABLE 3

Example CVs and their respective targets/limits, purposes and priorities of a supervisory well MPC controller

| CV | Target/Limits | Purpose | Priority |
|---|---|---|---|
| Group/Field Oil flow | Target or narrow limits | Produce oil around the long-term target. | 2 |
| Group/Field water injection flow | Target or narrow limits | Inject water around the long-term target. | 2 |

TABLE 3-continued

Example CVs and their respective targets/limits, purposes
and priorities of a supervisory well MPC controller

| CV | Target/Limits | Purpose | Priority |
| --- | --- | --- | --- |
| Short-term individual well oil target | Well flow Compliance limits around the long-term target | | 3-100 depending on priority for different wells. * |
| Short-term individual well water injection target | Well flow Compliance limits around the long-term target | | 3-100 depending on priority for different wells. * |
| Disposal water header pressure | High/Low limits | To match production and injection of water. | 1(Highest) |
| Reservoir pressure | High/Low limits | To match oil production and water injection | 1(Highest) |
| Injection to production ratio (IPR) | High/Low limits | To match oil production and water injection | 1(Highest) |

* In some implementations, different wells can be assigned different priorities. In some implementations, the priority for low and high limits can be different in order to differentiate the wells' priority for increasing flow versus decreasing flow. For example, a well that is most suitable for increase in flow is also the least suitable for decreasing the flow and vice versa.

TABLE 4

Example MVs and their respective objectives
of a supervisory MPC controller

| MV | Objective |
| --- | --- |
| Short-term individual well oil targets | Keep as close to the long-term targets as possible |
| Short-term individual well water injection target | Keep as close to the long-term targets as possible |

In some implementations, the example two-layer monitoring and control techniques based on the MPC technology can be implemented in an advisory mode that includes setting up an advanced control development environment (ADE) on a corporate network. The ADE can include a virtual server that hosts the MPC software. The MPC controllers on ADE can communicate with the data historian on the corporate network to read data of the wells and generate suggestions such as how to change the speeds and voltages to speed ratio of the ESP as well as opening of the choke valves that are in the field, for example, in real time. In some implementations, the MPC software in the ADE is programmed to function as the supervisory MPC at the group or field level. In some implementations, the MPC software in the ADE is also programmed to serve as the individual MPCs of the production and injection wells at the well level.

In some implementations, the example two-layer monitoring and control mechanism can include a closed loop MPC implementation at site. The closed loop MPC implementation includes an MPC server connected to a control system (for example, a supervisory control and data acquisition (SCADA) system or a Distributed Control System (DCS)) at site (for example, in a control room) hosting the MPC software. The MPC controllers on the server can communicate with the wells using one or more open platform communications (OPC) servers. For example, one OPC server can be used for reading all well information and writing to production choke valves in the field; another OPC server can be used for writing to ESP speed and trip settings. In some implementations, a user interface can be displayed on an operator station that allows the operator or engineer to interact with the MPC controller.

FIG. 2 is a screenshot 200 showing an example user interface 201 of an MPC controller for a production well. The top portion 215 of the user interface 201 shows example control variables (CV) 210 per production well (~15 variables/well), as well as the statuses 240, lower limits 252, current values 254, steady state (SS) values 256, upper limits 258 and setpoints 260 of the CVs 210 respectively. The bottom portion 225 of the user interference 201 shows the manipulation variables (MV) 230 for that the production well (3 variables/well), as well as the modes 262, statuses 270, lower limits 272, current values 274, steady state values 276, upper limits 278, MV moves or changes 280 and move causes of the MVs 282 respectively.

The screenshot 200 is taken at a time and shows that the CVs 210 are being monitored and maintained within their limits, and the MVs are automatically manipulated in order to maintain the monitored variables within their limits. The user interface 201 can be updated continuously (for example, in real time), periodically, or upon user's request to reflect a current status of the MPC controller for the production well. The MPC automatically changes the MVs by an amount indicated as MOVE 280 in order to keep CVs 210 at their setpoint 260 or within limits 252 and 258. In some implementations, the user interface 201 is updated to reflect the changes. For example, the user interface 201 is updated every time the MPC executes, which maybe once every minute to once every few minutes.

Figure 3:
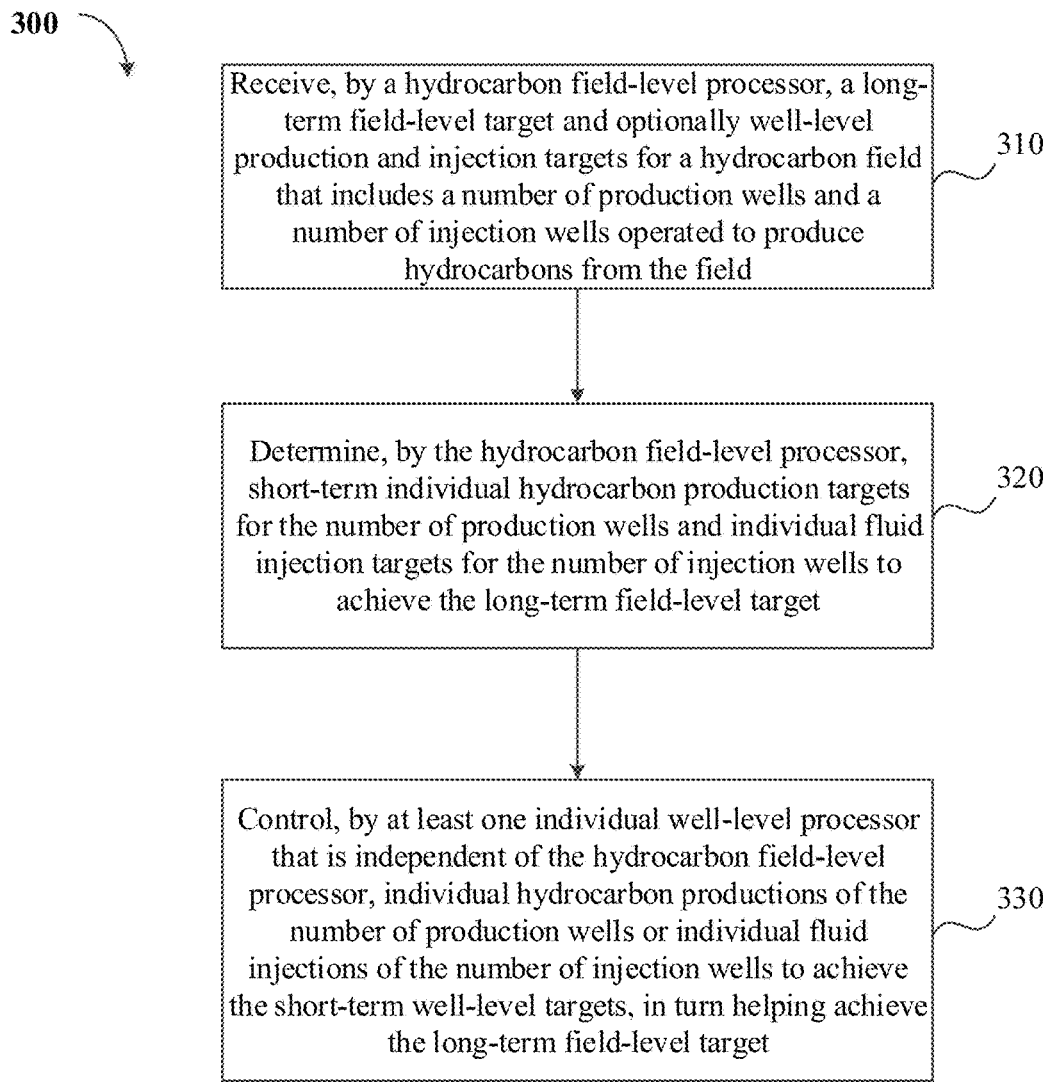
FIG. 3 is a high-level flow chart showing an example process for automated control of production and injection wells in a hydrocarbon field.

FIG. 3 is a flow chart showing an example process 300 for automated control of production and injection wells in a hydrocarbon field. The process 300 can be implemented, for example, by operation of data processing apparatus, for example, one or more controllers (for example, MPC controllers, PID controllers, or a combination of these and other types of controllers). For example, the one or more controllers can include a data processing apparatus (for example, one or more processors), a computer-readable medium (for example, a memory), and communication interfaces (for example, input/output controllers and network interfaces). The controllers can perform some or all operations described in connection with FIGS. 1-2 individually or in collaborations with other components (for example, a computing subsystem) of a well system. Because MPC is a software specially designed to interface with control system and optimize a multivariable process, an MPC controller involves higher level mathematics and an internal model matrix that a general purpose controller cannot handle and is more suitable for performing some or all operations described here.

At 310, at a hydrocarbon field level, a long-term (for example, weekly/monthly) field-level target for a hydrocarbon field is received, for example, by a hydrocarbon field-level processor. The hydrocarbon field-level processor can be, for example, the processor of the supervisory MPC controller 112 in FIG. 1 or another data processing apparatus. The hydrocarbon field can include a number of production wells and a number of injection wells operated to produce hydrocarbons from the field. The number of production wells and the number of injection wells can be large, for example, in the range of multiple tens and hundreds. The hydrocarbon field-level processor can, for example, produce 120,000 barrels of oil per day by 60 production wells and 30 injection wells in the hydrocarbon field.

The long-term field-level target can include a long-term field-level production target that indicates a quantity of hydrocarbons to be produced from the field through the number of production wells and a long-term field-level injection target that indicates a quantity of fluid to be injected into the field through the number of injection wells. In some implementations, optional well-level hydrocarbon production targets for the number of production wells, optional well-level fluid injection targets for the number of injection wells, or both are received, for example, by the hydrocarbon field-level processor as well.

At 320, short-term (for example, hourly/daily) individual hydrocarbon production targets for the number of production wells and short-term individual fluid injection targets for the number of injection wells are determined, for example, by the hydrocarbon field-level processor, to achieve the field-level hydrocarbon production target. The short-term individual hydrocarbon production targets and the short-term individual fluid injection targets can be different from the received long-term targets. For example, the hydrocarbon field-level processor can determine each individual hydrocarbon production target for each of the 60 production wells is 2,000 barrels of oil per day to achieve the field level target of 120,000 barrels of oil per day, and each individual fluid injection target for each of the 40 injection wells is 3,000 barrels of water per day to maintain a constant field level production to injection ratio of the hydrocarbon field.

The short-term individual hydrocarbon production targets and short-term individual fluid injection targets can be different among of the number of production wells and the number of injection wells. For instance, some production wells may be assigned higher short-term individual hydrocarbon production targets than other production wells. Similarly, some injection wells may be assigned higher short-term individual fluid injection targets than other injection wells. In some implementations, the hydrocarbon field-level processor can determine short-term individual hydrocarbon production targets for the number of production wells and short-term individual fluid injection targets for the number of injection wells, based on individual priorities or weights associated with the number of production wells and the number of injection wells. The priorities or weights associated with the number of production wells and the number of injection wells can depend on, for example, respective capabilities, locations, and operation conditions of the number of production wells and the number of injection wells, or any other criteria of the field-level operation of the hydrocarbon field.

The hydrocarbon field-level processor can monitor measurements of actual individual hydrocarbon production for the number of production wells and actual individual fluid injection for the number of injection wells, and adjust or otherwise determine short-term individual hydrocarbon production targets for the number of production wells and short-term individual fluid injection targets for the number of injection wells dynamically, based on the measurements, to make sure the field-level hydrocarbon production target to be achieved.

In some instances, an indication of one or more underperforming wells among the number of production wells and the number of injection wells can be received, for example, by the hydrocarbon field-level processor. An underperforming well can be a production well or an injection well that falls short of or otherwise deviate from their respective individual targets (for example, due to trip, maintenance, or other underperformance or unavailability). The hydrocarbon field-level processor can distribute one or more individual targets of the one or more underperforming wells among remaining wells of the number of wells in the field, to maintain the field-level hydrocarbon production target.

For example, if 10 of the 60 production wells and 4 of the 40 injection wells become unavailable, the hydrocarbon field-level processor may adjust the short-term individual hydrocarbon production target for each of the remaining 50 production wells to be 2,400 barrels of oil per day, to maintain the field level target of 120,000 barrels of oil per day, and each short-term individual fluid injection target for each of the remaining 36 injection wells is 3,333 barrels of water per day, to maintain a constant field level production to injection ratio of the hydrocarbon field.

In some implementations, the hydrocarbon field-level processor can adjust, or otherwise determine, short-term individual hydrocarbon production targets for the number of production wells and short-term individual fluid injection targets for the number of injection wells, according to the example techniques described with respect to Tables 3 and 4. For example, the short-term individual hydrocarbon production targets for the number of production wells and individual fluid injection targets for the number of injection wells can be regarded as the MVs of an MPC controller as shown in Table 4. The hydrocarbon field-level processor can adjust or otherwise determine values of the manipulation variables so as to achieve the respective targets or limits of the controlling variables as shown in Table 3. The respective targets or limits of the controlling variables shown in Table 3 can represent the long-term field-level hydrocarbon production target, as well as the field-level compliance requirements (for example, pressure and IPR limits), and other optimization goals (for example, ESP power optimization) of the hydrocarbon field.

At 330, at an individual well level, individual hydrocarbon productions of the number of the production wells or individual fluid injections of the number of injection wells are controlled, for example, by at least one individual well level processor (for example, at least one of the MPC controllers 122, 124, 126, and 132 or PID controller 142 in FIG. 1) that is independent of the hydrocarbon field-level processor, to achieve the individual hydrocarbon production short-term targets for the number of production wells and individual fluid injection short-term targets for the number of injection wells. This in turn helps achieve the long-term field-level target for the hydrocarbon field. In some implementations, controlling individual hydrocarbon productions of the number of production wells or individual fluid injections of the number of injection wells includes manipulating a choke valve or an electrical submersible pump (ESP) associated with one of the number of production wells.

In some implementations, controlling individual hydrocarbon productions of the number of the production wells includes manipulating one or more manipulation variables of one of the number of the production wells, so as to achieve the individual hydrocarbon production target of the one of the number of production wells according to the example techniques described with respect to Tables 1 and 2. For example, the at least one individual well level processor can adjust or otherwise determine values of the manipulation variables shown in Table 2, so as to achieve the respective targets or limits of the controlling variables shown in Table 1. The respective targets or limits of the controlling variables shown in Table 1 can represent the short-term well-level hydrocarbon production target, as well as the well-level compliance requirements (for example, pressure, temperature, and electrical limits) of the one of the number of the production wells.

In some implementations, the long-term field-level hydrocarbon production target or the field-level compliance requirements can be adjusted or updated, for example, based on a production plan, the dynamic operation condition of the hydrocarbon field. In some implementations, the example process 300 can be executed to account for the change and dynamically control the production and injection wells in the hydrocarbon production, for example, in real time.

Figure 4:
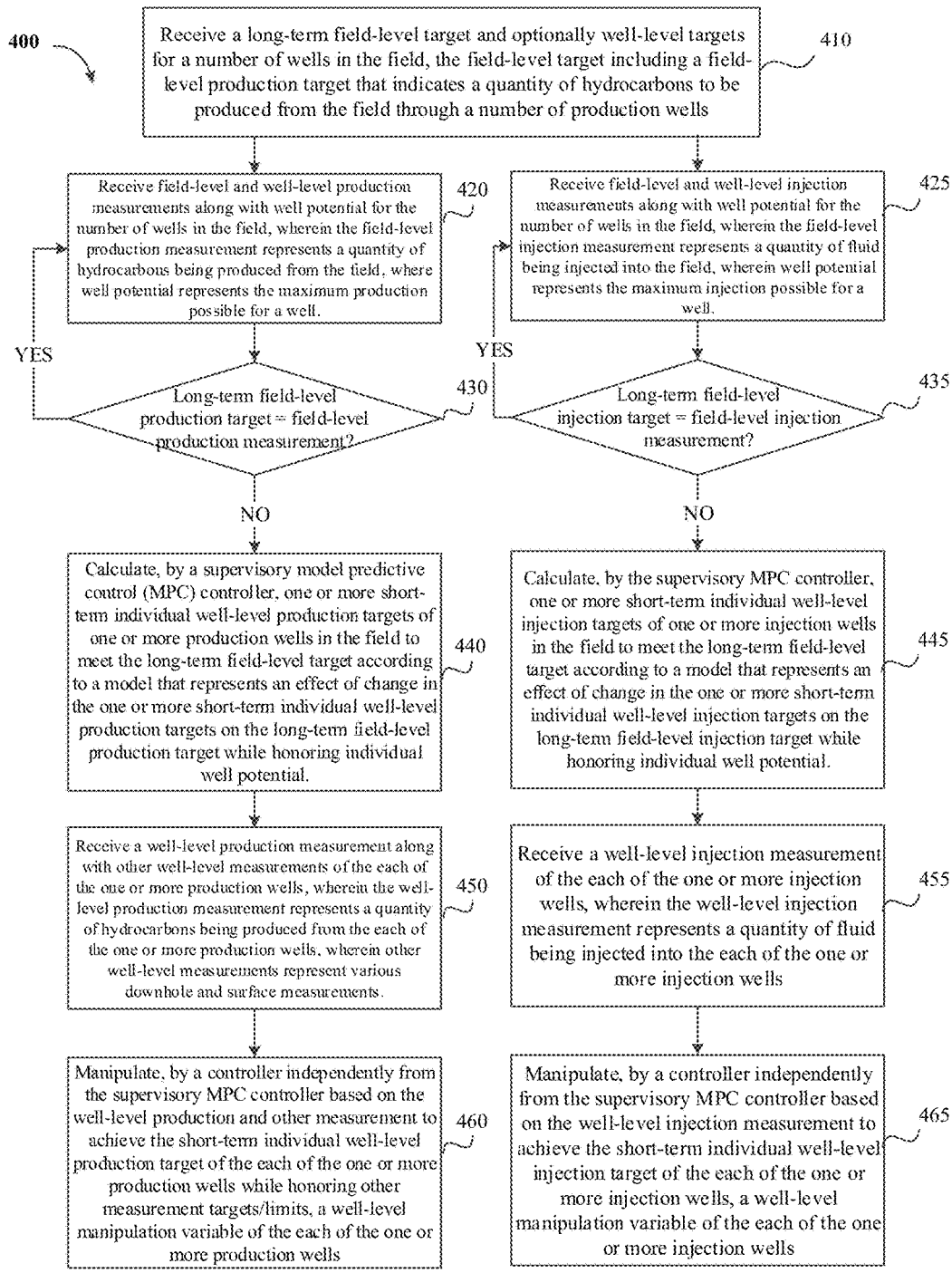
FIG. 4 is a detailed flow chart showing an example process for automated control of production and injection wells in a hydrocarbon field.

FIG. 4 is a flow chart showing an example process 400 for automated control of production and injection wells in a hydrocarbon field. The hydrocarbon field includes a number of production wells and a number of injection wells. The process 400 can be implemented, for example, by operation of data processing apparatus, for example, one or more controllers (for example, MPC controllers, PID controllers, or a combination of these and other types of controllers). For example, the one or more controllers can include a data processing apparatus (for example, one or more processors), a computer-readable medium (for example, a memory), and communication interfaces (for example, input/output controllers and network interfaces). The controllers can perform some or all operations described in connection with FIGS. 1-3, individually or in collaborations with other components (for example, a computing subsystem) of a well system.

At 410, a long-term field-level target for a number of wells in the field is received, for example, by a supervisory model predictive control (MPC) controller. The long-term field-level target includes a long-term field-level production target that indicates a quantity of hydrocarbons to be produced from the field through a number of production wells. In some implementations, the long-term field-level production target further includes a long-term field-level injection target that indicates a quantity of fluid to be injected into the field through the number of injection wells. As an example, the field-level production target can include a total amount of oil to be produced from the field through the number of production wells and a total amount of water to be injected into the field through the number of injection wells.

In some implementations, optional long-term well-level targets for the number of wells in the field are received by the supervisory MPC controller as well. Each of the optional long-term well-level targets can include a production target for each of the number of production wells in the field, an injection target for each of the number of injection wells in the field, or both. The production target for each of the number of production wells can be a long-term well-level production target indicating a quantity of hydrocarbons to be produced from the each production well. The injection target for each of the number of injection wells can be a long-term well-level injection target indicating a quantity of fluid to be injected into the field through the each injection well.

In some implementations, the example method 400 can control production and injection wells in parallel, for example, simultaneously. For instance, a supervisory model predictive control (MPC) controller can be used to receive the overall long-term field-level target that includes both the field-level production and injection targets, and determine short-term individual well-level production targets of one or more production wells and short-term individual well-level injection targets of one or more injection wells in the field simultaneously. Based on the short-term individual well-level production and injection targets, the respective production wells and injection wells can be controlled by individual controllers in a distributed and independent manner, for example, in parallel or in sequence, without substantial delay, so that the overall long-term field-level target that includes both the field-level production and injection targets can be achieved.

For the production wells, at 420, field-level and well-level production measurements along with well potential for the number of wells in the field are received, for example, by the supervisory MPC controller or another data processing apparatus. In some implementations, the supervisory MPC controller can monitor, or otherwise receive, the field-level production measurements and well potentials in real time, on a regular basis, or from time to time (for example, when a change occurs). The field-level production measurement represents a quantity of hydrocarbons being produced from the field. The well-level production measurement represents a quantity of hydrocarbons being produced from a production well in the field. As an example, the field-level production measurement can be a sum of the well-level production measurements of all the production wells in the field, representing the quantities of hydrocarbons being produced from all the production wells in the field. The well potential represents the maximum quantity of hydrocarbons that can be produced from the production well based on current conditions. The well potential of a well can be higher or lower than the short-term flow target for the well.

At 430, whether the long-term field-level production target is different from the field-level production measurement is determined. In some instances, if it is determined that the long-term field-level production target is the same as the field-level production measurement, no change is needed. As such, the example process 400 goes back to 420 for monitoring, or otherwise receiving, a field-level production measurement and well potential for the number of wells in the field.

In some instances, if it is determined that the long-term field-level production target is different from the field-level production measurement, at 440, one or more short-term individual well-level production targets of one or more production wells in the field are adjusted or otherwise calculated, for example, by the supervisory MPC controller, to meet the long-term field-level target according to a model that represents an effect of change in the one or more short-term individual well-level production targets on the long-term field-level production target while honoring the individual well potential. In some implementations, the one or more short-term individual well-level production targets are adjusted or otherwise calculated by either adjusting the optional long-term well-level targets or by developing the short-term well-level targets themselves.

In some implementations, the model includes one or more field-level control variables (for example, control variables shown in Table 3) of the number of wells in the field. The one or more field-level control variables have corresponding field-level control variable targets. A field-level control variable target can be represented in the form of a single value, an upper limit, a lower limit, a range, or a combination of them. The one or more field-level control variables and the corresponding field-level control variable targets represent the field-level target (for example, to produce a desired quantity of hydrocarbons from the field through a number of production wells by injecting a specified quantity of water into the field through a number of injection wells). In some implementations, the one or more field-level control variables and the corresponding field-level control variable targets further represent field-level compliance requirements. For example, the field-level compliance requirement can include a specific injection to production ratio (IPR) of the number of wells in the field (i.e., the total quantity of water being injected into the field through the number of injection wells divided the total quantity of hydrocarbons being produced from the field through the number of production wells). In some implementations, the field-level compliance requirement can include a reservoir pressure to match the production and injection from the hydrocarbon field. As an example, a higher quantity of water injection than required to produce a desired quantity of hydrocarbon will result in an increase in the reservoir pressure and vice versa. So maintaining the reservoir pressure within limits help ensure a balance between injection and production.

In some implementations, adjusting or calculating the one or more short-term individual well-level production targets of one or more production wells and the one or more short-term individual well-level injection targets of one or more injection wells in the field to meet the long-term field-level target according to the model includes adjusting or calculating the one or more short-term individual well-level production targets of one or more production wells and the one or more short-term individual well-level injection targets of one or more injection wells in the field such that the one or more field-level control variables of the number of wells in the field meet the corresponding field-level control variable targets (and the field-level compliance requirement). The one or more field-level control variables includes, for example, one or more of a quantity of field-level oil flow (for example, the total amount of oil being produced from the field), a quantity of field-level water flow (for example, the total amount of water being injected into the field), an oil production target of an individual well, a water injection target of an individual well, a disposal water header pressure, reservoir pressure or injection to production ratio.

In some implementations, the one or more field-level control variables are associated with corresponding priorities (for example, the priorities shown in Table 3). The priorities indicate weights of the corresponding field-level control variable targets in achieving the field-level target. In some implementations, the priorities associated with the number of production wells can be different. Accordingly, the one or more short-term individual well-level production targets of one or more production wells can be adjusted differently to meet the long-term field-level target.

At 450, for each of the one or more production wells in the field, a well-level production measurement of the each of the one or more production wells is received, for example, by a controller, independently from the supervisory MPC controller. The controller can be, for example, an individual MPC controller for the each of the one or more production wells. The well-level production measurement represents a quantity of hydrocarbons being produced from the each of the one or more production wells. In some implementations, the controller can also receive other well-level measurements such as various downhole and surface measurements indicating the downhole and surface conditions of the individual well.

At 460, a well-level manipulation variable of the each of the one or more production wells is manipulated, for example, by the controller, independently from the supervisory MPC controller, based on the well-level production and other well-level measurements to achieve the short-term individual well-level target of the each of the one or more production wells, while honoring limits or constraints on the other well-level measurements. In some implementations, manipulating the well-level manipulation variable of the each of the one or more production wells includes manipulating a valve or an electrical submersible pump (ESP) associated with the each of the one or more production wells. The well-level manipulation variable can include one or more of the example well-level manipulation variables shown in Table 2. For example, the well-level manipulation variable includes one or more of an opening of a choke valve, a speed of the ESP, or a voltage to speed ratio of the ESP.

In some implementations, the controller manipulates, independently from the supervisory MPC controller, the well-level manipulation variable based on an individual well-level model of the each of the one or more production wells. In some implementations, the individual well-level model is an empirical model developed for the each of the one or more production wells, for example, based on historic data or operations of the each of the one or more production wells. In some implementations, the individual well-level model represents an effect of change of the well-level manipulation variable on the individual well-level target, based on a location of an operating point in an ESP operating envelope. In some implementations, the individual well-level model includes one or more well-level control variables (for example, control variables shown in Table 1) of the number of production wells in the field. The one or more well-level control variables have corresponding well-level control variable targets. A well-level control variable target can be represented in the form of a single value, an upper limit, a lower limit, a range, or a combination of them. The one or more well-level control variables and the corresponding well-level control variable targets can represent the individual well-level target of the each of the one or more production wells, for example, as explained by the purposes shown in Table 1.

In some implementations, the well-level production measurement received at 450 represents a measurement of the one or more measurements of the one or more well-level control variables. Accordingly, controlling a well-level manipulation variable of the each of the one or more production wells, based on the well-level production measurement, includes controlling the well-level manipulation variable of the each of the one or more production wells, such that one or more well-level control variables meet corresponding well-level control variable targets of the each of the one or more production wells. As an example, controlling a well-level manipulation variable of the each of the one or more production wells can include determining that the well-level production measurement that represents the one of the well-level control variable does not meet the corresponding well-level control variable target. In response to such a determination, the controller adjusts a well-level manipulation variable of at least one of the one or more production wells, such that the one or more well-level control variables meet the corresponding well-level control variable targets of the one of the one or more production wells.

In some implementations, the well-level control variable includes one or more of a quantity of individual oil flow (for example, the quantity of oil being produced from an individual well), a calculated downhole flow (for example, the quantity of water equivalent flow flowing through the ESP), a wellhead pressure, a choke DP, a pump suction pressure, a pump discharge pressure, a motor current, a motor volt, or a motor temperature.

In some implementations, the one or more well-level control variables and the corresponding well-level control variable targets further represent an individual well operating envelope of the each of the one or more production wells. The individual well operating envelope requirement includes, for example, one or more of a pressure, temperature, or electrical constraint of the each of the one or more production wells, as described with respect to Table 1.

In some implementations, the one or more well-level control variables are associated with corresponding priorities. The priorities indicate weights of the corresponding well-level control variable targets in achieving the individual well-level target of the each of the one or more production wells.

For the injection wells, operations 425, 435, 445, 455, and 465 analogous to operations 420, 430, 440, 450, and 460 for controlling the production wells can be performed. For example, similarly to an individual MPC controller being used for controlling the well-level manipulation variable of the each of the one or more production wells to achieve the individual well-level target of the each of the one or more production wells, at least one of an individual MPC controller is used for manipulating a well-level manipulation variable of an injection well, to achieve the individual well-level target of the each of the one or more injection wells. In some implementations, the well-level control of the injection well can be performed differently from the well-level control of the production well. For example, as an alternative or an addition to the individual MPC controller, a proportional-integral-derivative (PID) controller may be used for manipulating a well-level manipulation variable of an injection, well to achieve the individual well-level target of the each of the one or more injection wells.

Specifically, the long-term field-level target may further include a long-term field-level injection target that indicates a quantity of fluid to be injected into the field through the plurality of injection wells. The optional long-term well-level targets may further include optional well-level targets for each of the injection wells in the field. The one or more short-term individual well-level targets may further include one or more short-term individual well-level targets for each of the injection wells in the field.

At 425, long-term field-level and well-level injection measurements along with well potential for the number of wells in the field are received, for example, by the supervisory MPC controller or another data processing apparatus. In some implementations, the supervisory MPC controller can monitor or otherwise receive the field-level injection measurement along with well potential in real time, on a regular basis, or from time to time (for example, when a change occurs). The field-level injection measurement represents a quantity of injection fluid (for example, water) being injected into the field. The well-level injection measurement represents a quantity of fluid being injected into an injection well in the field. As an example, the field-level injection measurement can be a sum of the well-level injection measurements of all the injection wells in the field, representing the quantities of water being injected into the field. The well potential represents the maximum quantity of water that can be injected in the injection well based on current conditions.

At 435, whether the long-term field-level injection target is different from the field-level injection measurement is determined. In some instances, if it is determined that the long-term field-level injection target is the same as the field-level injection measurement, no change is needed. As such, the example process 400 goes back to 425 for monitoring or otherwise receiving a field-level injection measurement and well potential for the number of wells in the field.

In some instances, if it is determined that the long-term field-level injection target is different from the field-level injection measurement, at 445, one or more short-term individual well-level injection targets of one or more injection wells in the field are adjusted or otherwise calculated, for example, by the supervisory MPC controller, to meet the long-term field-level target, according to a model that represents an effect of change in the one or more short-term individual well-level injection targets on the long-term field-level injection target while honoring the individual well potential. In some implementations, the model can be the same as or different from the model used at 440 for adjusting one or more individual well-level production targets of one or more production wells. In some implementations, the one or more short-term individual well-level injection targets of one or more injection wells in the field are adjusted or otherwise calculated by either adjusting the optionally received long-term well-level injection targets or developing the short-term well-level injection targets themselves.

At 455, for each of the one or more injection wells in the field, a well-level injection measurement of the each of the one or more injection wells is received, for example, by a controller other than the supervisory MPC controller. The controller can be, for example, an individual MPC controller, a PID controller, or both for the each of the one or more injection wells. The well-level injection measurement represents a quantity of injection fluid being injected into the each of the one or more injection wells.

At 465, a well-level manipulation variable of the each of the one or more injection wells is manipulated, for example, by the controller, independently from the supervisory MPC controller, based on the well-level injection measurement to achieve the short-term individual well-level target of the each of the one or more injection wells.

In some implementations, the controller can be an MPC controller that controls the well-level manipulation variable, independently from the supervisory MPC controller, based on an individual well-level model of the each of the one or more injection wells. In some implementations, the individual well-level model is an empirical model developed for the each of the one or more injection wells, for example, based on historic data or operations of the each of the one or more injection wells. In some implementations, the individual well-level model represents an effect of change of the well-level manipulation variable on the individual well-level target.

In some implementations, the well-level injection measurement received at 455 represents a measurement of the one or more measurements of the one or more well-level control variables. Accordingly, manipulating a well-level manipulation variable of the each of the one or more injection wells based on the well-level injection measurement includes manipulating the well-level manipulation variable of the each of the one or more injection wells such that one or more well-level control variables meet corresponding well-level control variable targets of the each of the one or more injection wells. In some implementations, an injection well has only one control variable (for example, flow injection control variable) and only one manipulation variable (for example, choke valve).

In some implementations, the one or more well-level control variables and the corresponding well-level control variable targets further represent an individual well compliance requirement of the each of the one or more injection wells. The individual well compliance requirement includes, for example, a pressure constraint of the each of the one or more injection wells.

In some implementations, the one or more well-level control variables are associated with corresponding priorities. The priorities indicate weights of the corresponding well-level control variable targets in achieving the individual well-level target of the each of the one or more injection wells.

In some implementations, the controller can be a PID controller that controls, independently from the supervisory MPC controller, the well-level manipulation variable (for example, a choke valve movement) to maintain the well-level control variable (for example, a quantity of injection flow of the injection well) around the corresponding well-level control variable target while minimizing the choke valve movement (as an individual well compliance requirement). For instance, a low and high limit can be configured in the PID controller to limit extreme movement in the choke valves in the event of large change in the header pressure or faulty flow reading.

Figure 5:
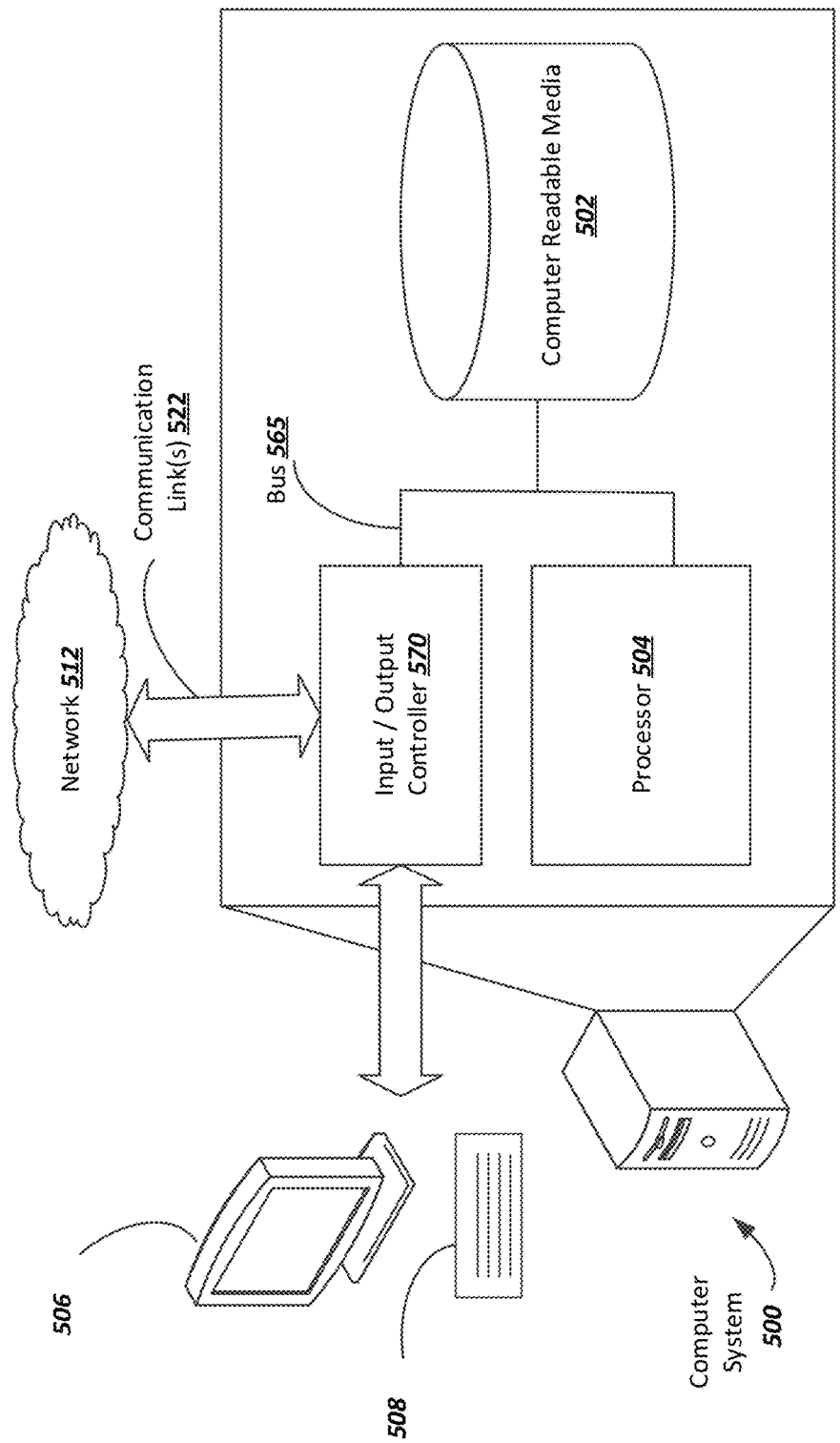
FIG. 5 is a schematic of an example computer system for performing automated control of production and injection wells in a hydrocarbon field.

FIG. 5 is a schematic of an example computer system 500 for performing automated control of production and injection wells in a hydrocarbon field. The example computer system 500 can be located in the hydrocarbon field that includes a large number of production and injection wells, or at a remote location. For example, the computer system 500 can be located at a data processing center, a computing facility, or another suitable location. The computer system 500 or any of its components can be located apart from the other components shown in FIG. 5. In some cases, all or part of the computer system 500 can be contained in a technical command center at the well site, in a real-time operations center at a remote location, in another appropriate location, or any suitable combination of these. The computer system 500 can include or access any suitable communication infrastructure (for example, communication link(s) 522 and network 512) for monitoring, accessing, and receiving data from and sending controlling signaling to the production wells and injection wells in the hydrocarbon field.

The example computer system 500 includes one or more of a data processing apparatus 504 (for example, one or more processors), a computer-readable medium 502 (for example, a memory), and input/output controllers 570 communicably coupled by a bus 565. The computer system 500 can be used to implement one or more controllers. For example, the computer system 500 can include processing apparatus and suitable computer-readable medium for implementing a supervisory MPC controller performing functions as described with respect to FIGS. 1-4. The computer system 500 can also include processing apparatus and suitable computer-readable medium for implementing individual MPC controllers for production wells (for example, MPC controllers 122, 124, and 126 for injection wells 125), individual MPC controllers (for example, an MPC controller 132) for injection wells, individual PID controllers (for example, a PID controller 142) for injection wells, or a combination of these and other types of controllers that are configured to perform the operations for automated control of production and injection wells in a hydrocarbon field as described with respect to FIGS. 1-4.

The computer-readable medium can include, for example, a random access memory (RAM), a storage device (for example, a writable read-only memory (ROM) and/or others), a hard disk, and/or another type of storage medium. The computer system 500 can be preprogrammed and/or it can be programmed (and reprogrammed) by loading a program from another source (for example, from a CD-ROM, from another computer device through a data network, and/or in another manner). The input/output controller 570 is coupled to input/output devices (for example, the display device 506, input devices 508 (for example, keyboard, mouse, etc.), and/or other input/output devices) and to a network 512. The input/output devices receive and transmit data in analog or digital form over communication link(s) 522, such as a serial link, wireless link (for example, infrared, radio frequency, and/or others), parallel link, and/or another type of link.

The network 512 can include any type of data communication network. For example, the network 512 can include a wireless and/or a wired network, a Local Area Network (LAN), a Wide Area Network (WAN), a private network, a public network (such as the Internet), a WiFi network, a network that includes a satellite link, and/or another type of data communication network.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, for example, a FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together, in a single software product, or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for controlling a plurality of wells in a hydrocarbon field, the method comprising:
   receiving a long-term field-level target for a plurality of wells in the field, the long-term field-level target comprising a long-term field-level production target that indicates a quantity of hydrocarbons to be produced from the field through a plurality of production wells;
   receiving a field-level production measurement for the plurality of wells in the field, wherein the field-level production measurement represents a quantity of hydrocarbons being produced from the field;
   determining that the long-term field-level production target is different from the field-level production measurement;
   in response to determining that the long-term field-level production target is different from the field-level production measurement, calculating, by a supervisory model predictive control (MPC) controller, one or more short-term individual well-level production targets of one or more production wells in the field to achieve the long-term field-level target according to a model that represents an effect of change in the one or more short-term individual well-level production targets on the long-term field-level production target, wherein each of the one or more short-term individual well-level production targets indicates a quantity of hydrocarbons to be produced from each of the one or more production wells; and
   for each of the one or more production wells in the field, receiving a well-level production measurement of the each of the one or more production wells, wherein the well-level production measurement represents a quantity of hydrocarbons being produced from the each of the one or more production wells; and
   manipulating, by a controller independently from the supervisory MPC controller based on the well-level production measurement to achieve the short-term individual well-level production target of the each of the one or more production wells received from the supervisory MPC controller, a well-level manipulation variable of the each of the one or more production wells, wherein manipulating the well-level manipulation variable of the each of the one or more production wells comprises:
      manipulating a valve or an electrical submersible pump (ESP) associated with the each of the one or more production wells, and
      manipulating, by an individual well MPC controller, the well-level manipulation variable based on an individual well-level model of the each of the one or more production wells,
      wherein the individual well-level model represents an effect of change of the well-level manipulation variable on individual well-level control variables, based on a location of an operating point in an ESP operating envelope.

2. The method of claim 1, further comprising receiving optional long-term well-level targets for the plurality of wells in the field, wherein each of the optional long-term well-level targets comprises a production target for each of the plurality of wells in the field; and
   wherein calculating one or more short-term individual well-level production targets of one or more production wells in the field comprises either adjusting the optional long-term well-level production targets or by developing the one or more short-term individual well-level production targets themselves.

3. The method of claim 2, wherein:
   the plurality of wells further comprise a plurality of injection wells,
   the long-term field-level target further comprises a long-term field-level injection target that indicates a quantity of fluid to be injected into the field through the plurality of injection wells;
   the optional long-term well-level targets further comprise optional well-level targets for the injection wells in the field; and
   the one or more short-term individual well-level production targets further comprise one or more short-term individual well-level targets for one or more injection wells in the field; and
   the method further comprising calculating, by the supervisory MPC controller, one or more short-term individual well-level injection targets of the one or more injection wells in the field to achieve the long-term field-level injection target according to the model, the model further representing an effect of change in the one or more short-term individual well-level injection targets on the long-term field-level injection target.

4. The method of claim 3, wherein the model comprises one or more field-level control variables of the plurality of wells in the field, wherein the one or more field-level control variables have corresponding field-level control variable targets, and the one or more field-level control variables and the corresponding field-level control variable targets represent the long-term field-level target.

5. The method of claim 4, wherein calculating the one or more short-term individual well-level production targets of one or more production wells and the one or more short-term individual well-level injection targets of one or more injection wells in the field, to achieve the long-term field-level target according to the model comprises adjusting the one or more short-term individual well-level production targets of one or more production wells and the one or more short-term individual well-level injection targets of one or more injection wells in the field, such that the one or more field-level control variables of the plurality of wells in the field achieve the corresponding field-level control variable targets.

6. The method of claim 4, wherein the one or more field-level control variables are associated with corresponding priorities, wherein the priorities indicate weights of the corresponding field-level control variable targets in achieving the long-term field-level target.

7. The method of claim 4, wherein the one or more field-level control variables comprises one or more of:
a quantity of field-level oil flow;
a quantity of field-level water injection flow;
an oil production target of an individual well;
a water injection target of an individual well;
a disposal water header pressure;
a reservoir pressure; or
an injection to production ratio.

8. The method of claim 1, wherein manipulating a well-level manipulation variable of the each of the one or more production wells, based on the well-level production measurement comprises:
manipulating the well-level manipulation variable of the each of the one or more production wells, such that one or more well-level control variables achieve corresponding well-level control variable targets of the each of the one or more production wells,
wherein the one or more well-level control variables and the corresponding well-level control variable targets represent the individual well-level target of the each of the one or more production wells, and
wherein the well-level production measurement represents a measurement of the one or more well-level control variables.

9. The method of claim 8, wherein the one or more well-level control variables and the corresponding well-level control variable targets further represent an individual operating envelope of the each of the one or more production wells.

10. The method of claim 8, wherein the one or more well-level control variables are associated with corresponding priorities, wherein the priorities indicate weights of the corresponding well-level control variable targets in achieving the individual well-level target of the each of the one or more production wells.

11. The method of claim 10, wherein the well-level control variable comprises one or more of:
a quantity of individual oil flow;
a quantity of downhole flow;
a wellhead pressure;
a choke differential pressure (DP);
a pump suction pressure;
a pump discharge pressure;
a motor current;
a motor volt; or
a motor temperature.

12. The method of claim 1, wherein the well-level manipulation variable comprises one or more of:
an opening of a choke valve;
a speed of the ESP; or
a voltage to speed ratio of the ESP.

13. A system comprising one or more computers that include:
a supervisory model predictive control (MPC) controller;
at least one individual well controller;
a non-transitory computer-readable storage medium coupled to the supervisory MPC controller and the at least one individual well controller, and storing programming instructions for execution by the supervisory MPC controller and the at least one individual well controller, the programming instructions instructing the supervisory MPC controller and the at least one individual well controller to:
receive a long-term field-level target for a plurality of wells in a field, the long-term field-level target comprising a long-term field-level production target that indicates a quantity of hydrocarbons to be produced from the field through a plurality of production wells;
receive a field-level production measurement for the plurality of wells in the field, wherein the field-level production measurement represents a quantity of hydrocarbons being produced from the field;
determine that the long-term field-level production target is different from the field-level production measurement;
in response to determining that the long-term field-level production target is different from the field-level production measurement, calculate, by the supervisory MPC controller, one or more short-term individual well-level production targets of one or more production wells in the field to achieve the long-term field-level target according to a model that represents an effect of change in the one or more short-term individual well-level production targets on the long-term field-level production target, wherein each of the one or more short-term individual well-level production targets indicates a quantity of hydrocarbons to be produced from each of the one or more production wells; and
for each of the one or more production wells in the field,
receive, a well-level production measurement of the each of the one or more production wells, wherein the well-level production measurement represents a quantity of hydrocarbons being produced from the each of the one or more production wells; and
manipulate, by the at least one individual controller independently from the supervisory MPC controller based on the well-level production measurement to achieve the short-term individual well-level production target of the each of the one or more production wells received from the supervisory MPC controller, a well-level manipulation variable of the each of the one or more production wells, wherein manipulating the well-level manipulation variable of the each of the one or more production wells comprises:

manipulating a valve or an electrical submersible pump (ESP) associated with the each of the one or more production wells, and manipulating, by an individual well MPC controller, the well-level manipulation variable based on an individual well-level model of the each of the one or more production wells, wherein the individual well-level model represents an effect of change of the well-level manipulation variable on individual well-level control variables, based on a location of an operating point in an ESP operating envelope.

14. The system of claim 13, the programming instructions further comprising instructing the supervisory MPC controller and the at least one individual well controller to receive optional long-term well-level targets for the plurality of wells in the field, wherein each of the optional long-term well-level targets comprises a production target for each of the plurality of wells in the field; and wherein the plurality of wells further comprise a plurality of injection wells, the long-term field-level target further comprises a long-term field-level injection target that indicates a quantity of fluid to be injected into the field through the plurality of injection wells, the optional long-term well-level targets further comprise optional long-term well-level targets for the plurality of injection wells in the field, and the short-term individual well-level production targets further comprise short-term well-level targets for the plurality of the injection wells in the field.

15. The system of claim 14, wherein the at least one individual controller comprises:

at least one individual well MPC controller for manipulating the well-level manipulation variable of the each of the one or more production wells to achieve the short-term individual well-level target of the each of the one or more production wells; and at least one of an individual well MPC controller or a proportional-integral-derivative (PID) controller for manipulating a well-level manipulation variable of an injection well to achieve the short-term individual well-level target of the each of the one or more injection wells.

16. The system of claim 13, wherein the well-level manipulation variable comprises one or more of:

an opening of a choke valve;
a speed of the ESP; or
a voltage to speed ratio of the ESP.

17. A method comprising:

in a hydrocarbon field comprising a plurality of production wells and a plurality of injection wells operated to produce hydrocarbons from the field:

at a hydrocarbon field level:

receiving, by a hydrocarbon field-level processor, a long-term field-level target and optional long-term well-level production targets for the hydrocarbon field, the long-term field-level target comprising a long-term field-level production target that indicates a quantity of hydrocarbons to be produced from the field through the plurality of production wells and a long-term field-level injection target that indicates a quantity of fluid to be injected into the field through the plurality of injection wells;

determining by the hydrocarbon field-level processor, short-term individual targets for the plurality of production wells and short-term individual fluid injection targets for the plurality of injection wells to achieve the long-term field-level target; and at an individual well level:

controlling, by at least one individual well-level processor that is independent of the hydrocarbon field-level processor, individual hydrocarbon productions of the plurality of production wells or individual fluid injections of the plurality of injection wells to achieve the long-term field-level target for the hydrocarbon field, wherein controlling individual hydrocarbon productions of the plurality of production wells or individual fluid injections of the plurality of injection wells comprises:

manipulating a valve or an electrical submersible pump (ESP) associated with one of the plurality of production wells, and manipulating, by an individual well MPC controller, the well-level manipulation variable based on an individual well-level model of the each of the one or more production wells, wherein the individual well-level model represents an effect of change of the well-level manipulation variable on individual well-level control variables, based on a location of an operating point in an ESP operating envelope.

18. The method of claim 17, further comprising:

receiving an indication of one or more underperforming wells among the plurality of production wells and the plurality of injection wells; and wherein determining by the hydrocarbon field-level processor, short-term individual hydrocarbon production targets for the plurality of production wells and short-term individual fluid injection targets for the plurality of injection wells to achieve the long-term field-level hydrocarbon production target comprises distributing one or more individual targets of the one or more underperforming wells among remaining wells of the plurality of wells in the field to maintain the long-term field-level target.

19. The method of claim 17, further comprising manipulating individual hydrocarbon productions of the plurality of the production wells comprises the short-term individual target of the plurality of the production wells to achieve the short-term individual target of the one of the plurality of the production wells, wherein the manipulation variable comprises one or more of:

an opening of a choke valve;
a speed of an ESP; or
a voltage to speed ratio of the ESP.

* * * * *